US012618352B2

(12) United States Patent
Oyagi et al.

(10) Patent No.: US 12,618,352 B2
(45) Date of Patent: May 5, 2026

(54) EXHAUST PURIFICATION APPARATUS

(71) Applicant: TOYOTA JIDOSHA KABUSHIKI KAISHA, Toyota (JP)

(72) Inventors: Hiroshi Oyagi, Kyoto (JP); Hirokazu Ito, Shizuoka-ken (JP); Kazuhiko Seguchi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/087,588

(22) Filed: Mar. 24, 2025

(65) Prior Publication Data

US 2025/0347243 A1 Nov. 13, 2025

(30) Foreign Application Priority Data

May 7, 2024 (JP) ................................ 2024-075270

(51) Int. Cl.
*F01N 3/28* (2006.01)
*B01F 23/231* (2022.01)
(Continued)

(52) U.S. Cl.
CPC ...... *F01N 3/2892* (2013.01); *B01F 23/23126* (2022.01); *B01F 25/40* (2022.01);
(Continued)

(58) Field of Classification Search
CPC .... F01N 3/2892; F01N 13/10; F01N 2330/34; F01N 2330/36; F01N 2330/38; F01N 2470/04; F01N 2470/10; F01N 2470/20; F01N 2490/16; F01N 2490/18; B01F 23/2312; B01F 23/23126; B01F 25/40; B01F 25/41; B01F 25/433
See application file for complete search history.

(56) References Cited

U.S. PATENT DOCUMENTS 5,873,242 A * 2/1999 Morishima ........... F01N 3/0807 60/297
2010/0077742 A1 * 4/2010 Ehlen .................. B01F 25/4315 60/324

(Continued)

FOREIGN PATENT DOCUMENTS

JP 2006009793 A 1/2006

*Primary Examiner* — Binh Q Tran

(57) ABSTRACT

An exhaust purification apparatus includes a connection portion that connects an exhaust manifold to a catalytic converter. The connection portion includes a diffusion portion and a coupling portion. The coupling portion is configured such that a cross-sectional area of a passage of the coupling portion increases from a connection point with the diffusion portion toward a connection point with the catalytic converter. The side surface of the diffusion portion includes a connection surface to which the exhaust manifold is connected, a collision surface with which the exhaust gas that has flowed into the diffusion portion from the exhaust manifold strikes, a first coupling surface, and a second coupling surface. Cross-sectional shapes of the first coupling surface, the second coupling surface, and the collision surface are arcuate. The cross-sectional shape of the collision surface has a smaller curvature than the cross-sectional shapes of the first and second coupling surfaces.

3 Claims, 4 Drawing Sheets

(51) Int. Cl.
*B01F 25/40* (2022.01)
*B01F 25/433* (2022.01)

(52) U.S. Cl.
CPC ......... *B01F 25/433* (2022.01); *F01N 2330/34* (2013.01); *F01N 2330/38* (2013.01); *F01N 2470/10* (2013.01); *F01N 2470/20* (2013.01); *F01N 2490/16* (2013.01)

(56) References Cited

U.S. PATENT DOCUMENTS

| | | | | |
|---|---|---|---|---|
| 2010/0083643 | A1* | 4/2010 | Hayashi | F01N 13/0093 60/297 |
| 2013/0064725 | A1* | 3/2013 | Kageyama | B01D 53/92 422/168 |
| 2015/0047324 | A1* | 2/2015 | Beckmann | F01N 3/2066 60/274 |
| 2019/0063293 | A1* | 2/2019 | Fischer | B01F 23/2132 |
| 2019/0366268 | A1* | 12/2019 | Kuramashi | F01N 3/10 |
| 2022/0065147 | A1* | 3/2022 | Sugaya | F01N 13/1805 |

* cited by examiner

EXHAUST PURIFICATION APPARATUS

CROSS-REFERENCE TO RELATED APPLICATIONS

This application is based upon and claims the benefit of priority from Japanese Patent Application No. 2024-075270, filed on May 7, 2024, the entire contents of which are incorporated herein by reference.

BACKGROUND

1. Field

The present disclosure relates to an exhaust purification apparatus installed in an internal combustion engine.

2. Description of Related Art

Japanese Laid-Open Patent Publication No. 2006-9793 discloses an example of an exhaust purification apparatus. This apparatus includes an exhaust manifold, a catalytic converter, and a swirling flow generator positioned between the exhaust manifold and the catalytic converter. In the exhaust purification apparatus, when exhaust gas flow from the exhaust manifold into the swirling flow generator, a swirl flow of the exhaust gas is generated in the swirling flow generator. This results in the diffusion of the exhaust gas flow that enters the catalytic converter.

In the exhaust purification apparatus, the condensed water generated in the exhaust manifold flows into the swirling flow generator, which is located below the exhaust manifold. The outflow portion for guiding exhaust gas to the catalytic converter is connected to a part above the lowermost portion of the swirling flow generator. Therefore, there is a risk that condensed water may accumulate in the swirling flow generator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present disclosure provides an exhaust purification apparatus. The exhaust purification apparatus includes an exhaust manifold, a cylindrical catalytic converter, and a connection portion that connects the exhaust manifold to the catalytic converter. The exhaust purification apparatus is configured such that exhaust gas that has flowed from the exhaust manifold into the connection portion is directed to the catalytic converter. The connection portion includes a tubular diffusion portion to which the exhaust manifold is connected, and a coupling portion that couples the diffusion portion to the catalytic converter. The diffusion portion is arranged such that a central axis of the diffusion portion aligns with a central axis of the catalytic converter. The coupling portion is configured such that a cross-sectional area of a passage of the coupling portion increases from a connection point with the diffusion portion toward a connection point with the catalytic converter. A side surface of the diffusion portion includes a connection surface to which the exhaust manifold is connected. The side surface includes a collision surface arranged such that a central axis of the diffusion portion is positioned between the collision surface and the connection surface. Exhaust gas that has flowed from the exhaust manifold into the diffusion portion collides with the collision surface. The side surface includes a first coupling surface that couples an upper end of the connection surface to an upper end of the collision surface. The side surface includes a second coupling surface that couples a lower end of the connection surface to a lower end of the collision surface. Cross-sectional shapes of the first coupling surface, the second coupling surface, and the collision surface along a plane orthogonal to the central axis of the diffusion portion is arcuate. A curvature of the cross-sectional shape of the collision surface is smaller than curvatures of the cross-sectional shapes of the first coupling surface and the second coupling surface.

A second aspect of the present disclosure provides an exhaust purification apparatus. The exhaust purification apparatus includes an exhaust manifold, a cylindrical catalytic converter, and a connection portion that connects the exhaust manifold to the catalytic converter. The exhaust purification apparatus is configured such that exhaust gas that has flowed from the exhaust manifold into the connection portion is directed to the catalytic converter. The connection portion includes a tubular diffusion portion to which the exhaust manifold is connected, and a coupling portion that couples the diffusion portion to the catalytic converter. The diffusion portion is arranged such that a central axis of the diffusion portion aligns with a central axis of the catalytic converter. The coupling portion is configured such that a cross-sectional area of a passage of the coupling portion increases from a connection point with the diffusion portion toward a connection point with the catalytic converter. A side surface of the diffusion portion includes a connection surface to which the exhaust manifold is connected. The side surface includes a collision surface arranged such that a central axis of the diffusion portion is positioned between the collision surface and the connection surface. Exhaust gas that has flowed from the exhaust manifold into the diffusion portion collides with the collision surface. The side surface includes a first coupling surface that couples an upper end of the connection surface to an upper end of the collision surface. The side surface includes a second coupling surface that couples a lower end of the connection surface to a lower end of the collision surface. The collision surface is flat.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

An exhaust purification apparatus according to a first embodiment will now be described with reference to FIGS. 1 to 3B.

Configuration of Exhaust Purification Apparatus

Figure 1:
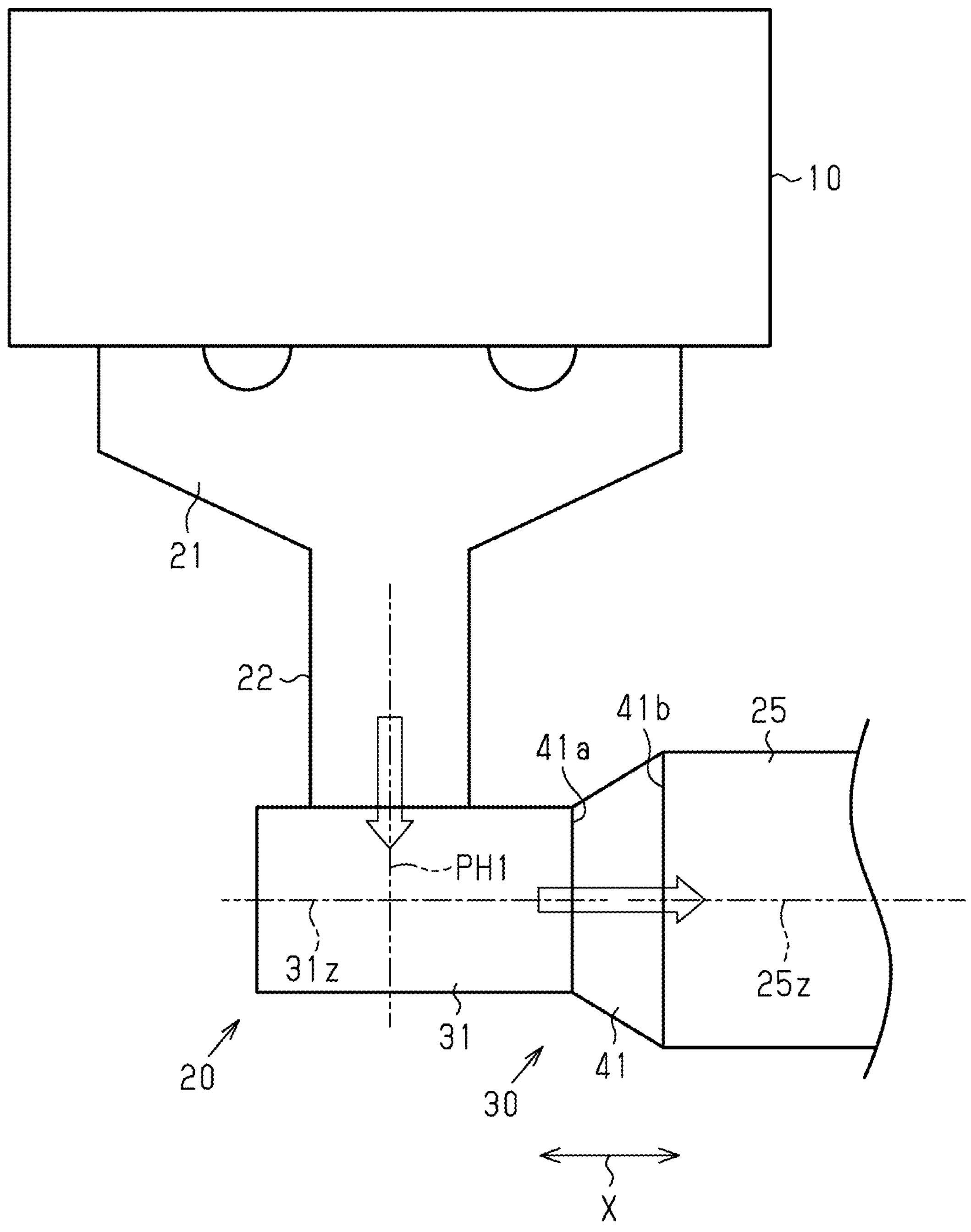
FIG. 1 is a schematic diagram illustrating an exhaust purification apparatus according to a first embodiment and an internal combustion engine that discharges exhaust gas into the exhaust purification apparatus.

FIG. 1 illustrates an exhaust purification apparatus 20 and an internal combustion engine 10 in which the exhaust purification apparatus 20 is employed. The exhaust purification apparatus 20 includes an exhaust manifold 21, a connection portion 30, and a cylindrical catalytic converter 25. Exhaust gases generated in multiple cylinders of the internal combustion engine 10 are discharged into the exhaust manifold 21. The exhaust manifold 21 includes a merging portion 22 where exhaust gases discharged from the cylinders merge.

The connection portion 30 connects the merging portion 22 of the exhaust manifold 21 to the catalytic converter 25. Therefore, as indicated by the blank arrow in FIG. 1, the exhaust gas that has flowed from the merging portion 22 to the connection portion 30 is directed toward the catalytic converter 25.

The connection portion 30 includes a tubular diffusion portion 31 to which the exhaust manifold 21 is connected, and a coupling portion 41 that couples the diffusion portion 31 to the catalytic converter 25. The diffusion portion 31 is arranged such that the central axis 31*z* of the diffusion portion 31 aligns with the central axis 25*z* of the catalytic converter 25. When the central axis 31*z* of the diffusion portion 31 aligns with the central axis 25*z* of the catalytic converter 25, the central axis 31*z* overlaps the central axis 25*z* if the central axis 25*z* is extended. The coupling portion 41 includes a connection point 41*a* that is connected to the diffusion portion 31 and a connection point 41*b* that is connected to the catalytic converter 25. The coupling portion 41 includes a passage. The cross-sectional area of this passage increases from the connection point 41*a* toward the connection point 41*b*.

Figure 2A:
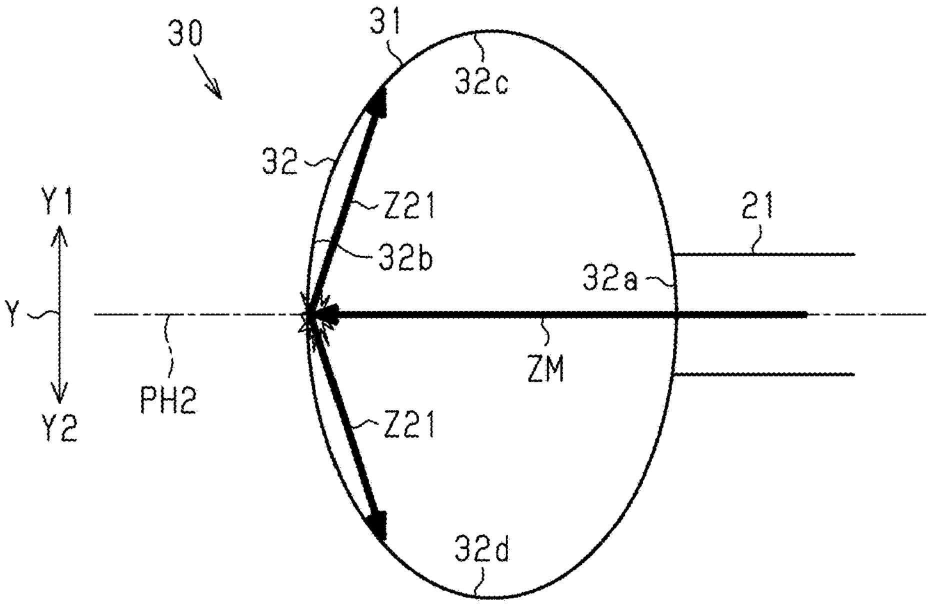
FIG. 2A is a schematic cross-sectional view of the diffusion portion included in the exhaust purification apparatus.
Figure 2B:
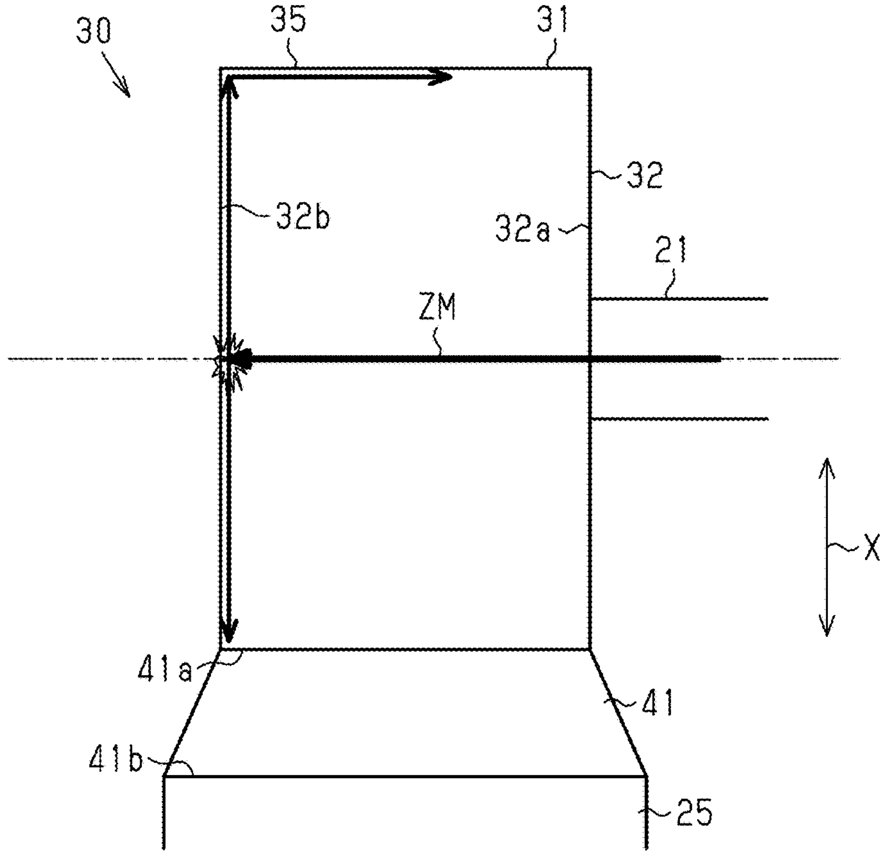
FIG. 2B is a schematic cross-sectional view taken along the central axis of the diffusion portion.

The structure of the diffusion portion 31 will now be described with reference to FIGS. 2A and 2B. FIG. 2A schematically illustrates the cross-sectional shapes of the merging portion 22 of the exhaust manifold 21 and the diffusion portion 31 along an imaginary plane PH1. The imaginary plane PH1 is orthogonal to the central axis 31*z* of the diffusion portion 31. FIG. 2B schematically illustrates the cross-sectional shapes of the diffusion portion 31, the coupling portion 41, and the catalytic converter 25 along an imaginary plane PH2. The imaginary plane PH2 is parallel to the central axis 31*z* of the diffusion portion 31 and orthogonal to the imaginary plane PH1.

Hereinafter, the direction in which the central axis 25*z* of the catalytic converter 25 extends is referred to as the longitudinal direction X. Of the directions along the imaginary plane PH1, the direction that is orthogonal to the front-rear direction X is referred to as the vertical direction Y. In the vertical direction Y, the upward direction in FIG. 2A is referred to as the upward direction Y1, and the downward direction in FIG. 2A is referred to as downward direction Y2. For example, the vertical direction Y coincides with the vertical direction of the vehicle when the internal combustion engine 10 is mounted in the vehicle.

As shown in FIGS. 2A and 2B, the diffusion portion 31 includes a tubular portion 32 and a bottom wall portion 35 that closes the opening of the tubular portion 32. The bottom wall portion 35 is located at one of the two ends of the tubular portion 32 that is opposite to the end where the coupling portion 41 is attached.

The tubular portion 32, as shown in FIG. 2A, has an elliptical shape. The side surface of the tubular portion 32 includes a connection surface 32*a*, a collision surface 32*b*, a first coupling surface 32*c*, and a second coupling surface 32*d*. The exhaust manifold 21 is connected to the connection surface 32*a*. The collision surface 32*b* is arranged such that the central axis 31*z* of the diffusion portion 31 is positioned between the collision surface 32*b* and the connection surface 32*a*. The exhaust gas that has flowed into the diffusion portion 31 from the exhaust manifold 21 collides with the collision surface 32*b*. The first coupling surface 32*c* is positioned in the upward direction Y1 relative to the connection surface 32*a* and the collision surface 32*b*. The first coupling surface 32*c* connects the upper end of the connection surface 32*a* to the upper end of the collision surface 32*b*. The second coupling surface 32*d* is positioned in the downward direction Y2 relative to the connection surface 32*a* and the collision surface 32*b*. The second coupling surface 32*d* connects the lower end of the connection surface 32*a* to the lower end of the collision surface 32*b*.

As shown in FIG. 2A, the cross-sectional shape of the diffusion portion 31 when it is cut; namely, the cross-sectional shapes of the first coupling surface 32*c*, second coupling surface 32*d*, and collision surface 32*b* along the imaginary plane PH1, which is orthogonal to the central axis 31*z* of the diffusion portion 31, is arcuate. Specifically, the curvature of the cross-sectional shape of the collision surface 32*b* is smaller than the curvature of the cross-sectional shapes of the first coupling surface 32*c* and the second coupling surface 32*d*.

Operation and Advantages of Present Embodiment

Figure 3A:
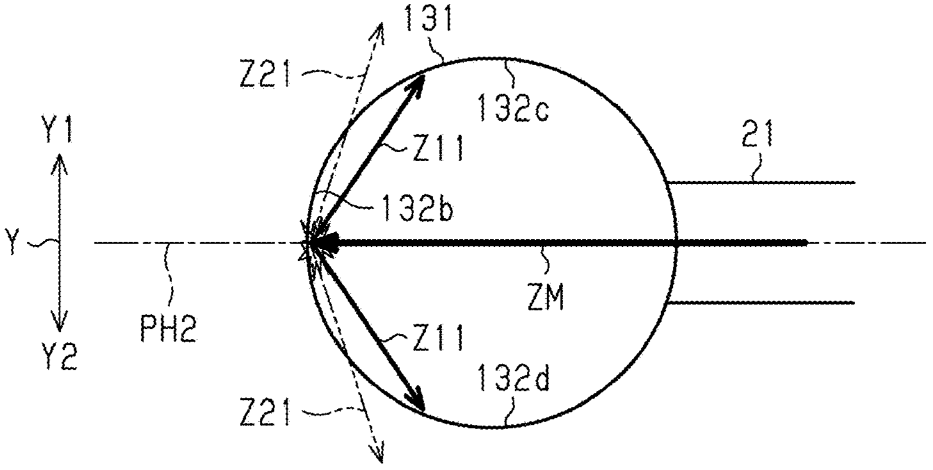
FIG. 3A is a schematic cross-sectional view of the diffusion portion of a comparative example.
Figure 3B:
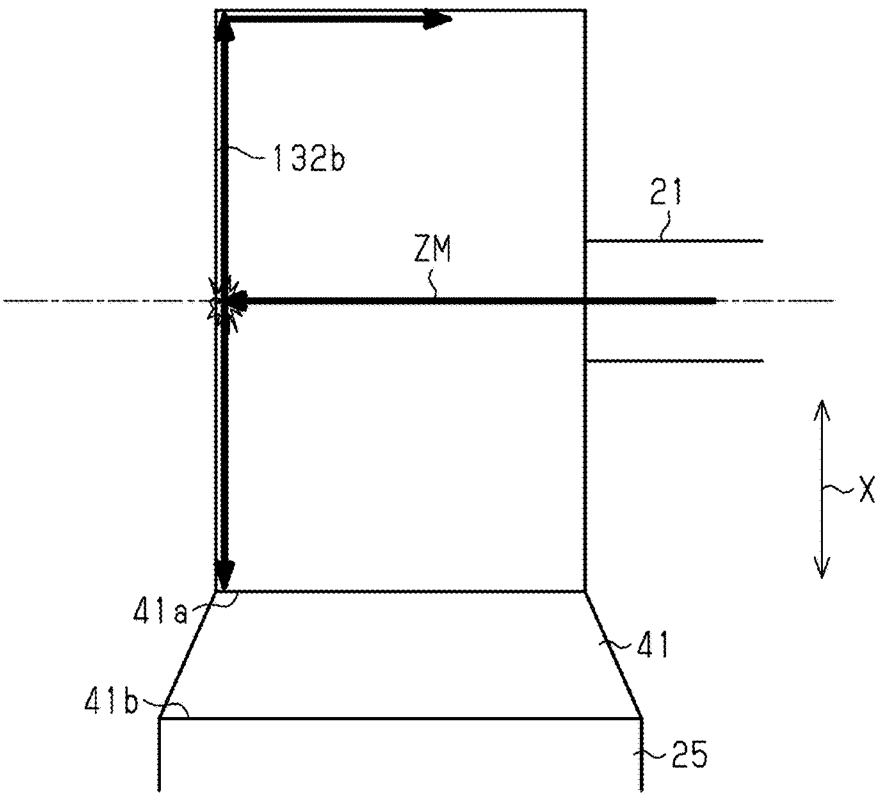
FIG. 3B is a schematic cross-sectional view taken along the central axis of the diffusion portion.

The operation and advantages of the present embodiment will now be described with reference to FIGS. 2A to 3B. FIGS. 3A and 3B illustrate a diffusion portion 131 according to a comparative example.

The diffusion portion 131 of the comparative example has a cylindrical shape. In the cross-sectional view of the diffusion portion 131 shown in FIG. 3A, the curvature of the cross-sectional shape of a collision surface 132*b* is equal to the curvatures of the cross-sectional shapes of a first coupling surface 132*c* and a second coupling surface 132*d*.

When exhaust gas flows into the diffusion portion 131 of the comparative example from the exhaust manifold 21, the exhaust gas collides with the collision surface 132*b*. As a result, as shown in FIGS. 3A and 3B, the exhaust gas that has collided with the collision surface 132*b* diffuses. As shown by arrows Z11 in FIG. 3A, some of the exhaust gas that has collided with the collision surface 132*b* flows toward the first coupling surface 132*c* and the second coupling surface 132*d* on the side surface of the diffusion portion 131. The flow direction in which the exhaust gas flows from the exhaust manifold 21 toward the collision surface 132*b* is referred to as a main flow direction ZM. The flow direction in which the exhaust gas flows toward the first coupling surface 132*c* and the second coupling surface 132*d* along the side surface of the diffusion portion 131 includes components in the direction opposite to the main flow direction ZM. In the flow direction in which the exhaust gas flows toward the first coupling surface 132*c* and the second coupling surface 132*d* along the side surface of the diffusion portion 131, as the components in the direction opposite to the main flow direction ZM increase, the exhaust gas is less likely to flow in the direction shown by arrows Z11.

As a result, as shown by arrows in FIG. 3B, in the exhaust gas that has collided with the collision surface 132*b*, the amount of exhaust gas directly flowing toward the catalytic converter 25 along the collision surface 132*b* tends to increase. Therefore, the exhaust gas is not sufficiently diffused in the diffusion portion 131. Thus, the uniform distribution of the amount of exhaust gas inflow to the front surface of the catalytic converter 25 is inadequate.

In the present embodiment, the diffusion portion 31, as illustrated in FIGS. 2A and 2B, is employed as a diffusion portion. The curvature of the collision surface 32*b* of the diffusion portion 31 is smaller than the curvature of the collision surface 132*b* of the diffusion portion 131 in the comparative example. In this case, as shown by arrows Z21 in FIG. 2A, some of the exhaust gas that has collided with the collision surface 32*b* flows along the side surface of the diffusion portion 31 toward the first coupling surface 32*c* and the second coupling surface 32*d*. The flow direction in which the exhaust gas flows toward the first coupling surface 32*c* and the second coupling surface 32*d* along the side surface of the diffusion portion 31 includes components in the direction opposite to the main flow direction ZM. However, in the flow direction in which the exhaust gas flows toward the first coupling surface 32*c* and the second coupling surface 32*d* along the side surface of the diffusion portion 31, the components in the direction opposite to the main flow direction ZM are smaller than those in the comparative example. This allows the exhaust gas to readily flow along the side surface of the diffusion portion 31 toward the first coupling surface 32*c* and the second coupling surface 32*d*.

As a result, in the exhaust gas that has collided with the collision surface 32*b* shown in FIG. 2B, the amount of exhaust gas that directly flows toward the catalytic converter 25 along the collision surface 32*b* is smaller than that in the comparative example. Thus, the exhaust gas is sufficiently diffused in the diffusion portion 31. This ensures uniform distribution of the amount of exhaust gas inflow to the front surface of the catalytic converter 25.

Additionally, the coupling portion 41, which is arranged between the diffusion portion 31 and the catalytic converter 25, is configured such that the cross-sectional area of the passage of the coupling portion 41 gradually increases toward the catalytic converter 25. Accordingly, the condensed water generated in the exhaust manifold 21 is less likely to accumulate in the connection portion 30.

Hence, the exhaust purification apparatus 20 achieves both the promotion of the diffusion of exhaust gas flowing into the catalytic converter 25 and the suppression of condensed water.

Second Embodiment

The second embodiment of the exhaust purification apparatus will now be described with reference to FIGS. 4A and 4B. In the second embodiment, the shape and the like of the diffusion portion differ from those in the first embodiment. The differences from the first embodiment will mainly be described below. Like or the same reference numerals are given to those components that are the same as the corresponding components of the first embodiment. Such components will not be described.

Structure of the Diffusion Portion

Figure 4A:
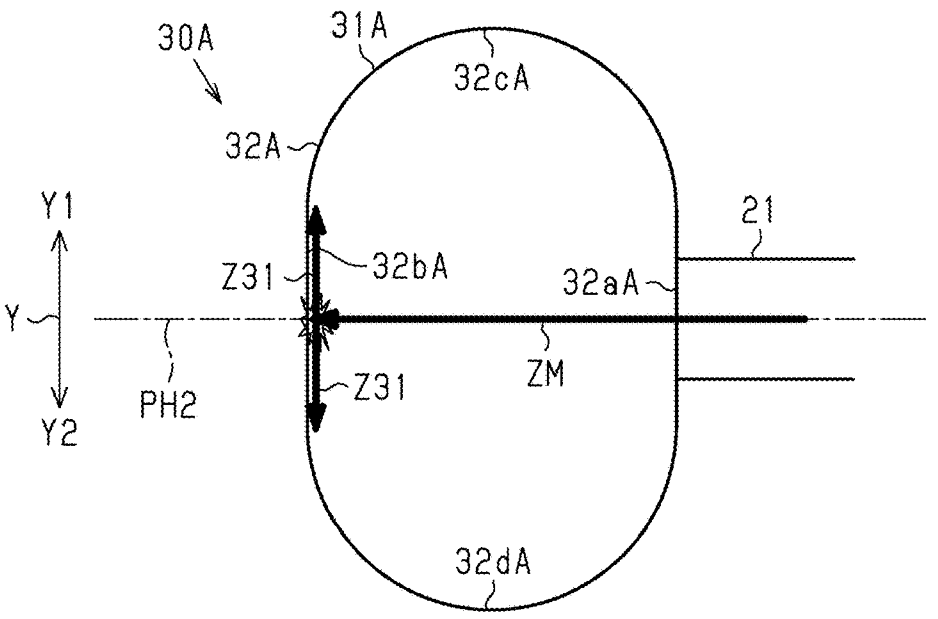
FIG. 4A is a schematic cross-sectional view of the diffusion portion included in the exhaust purification apparatus according to a second embodiment.
Figure 4B:
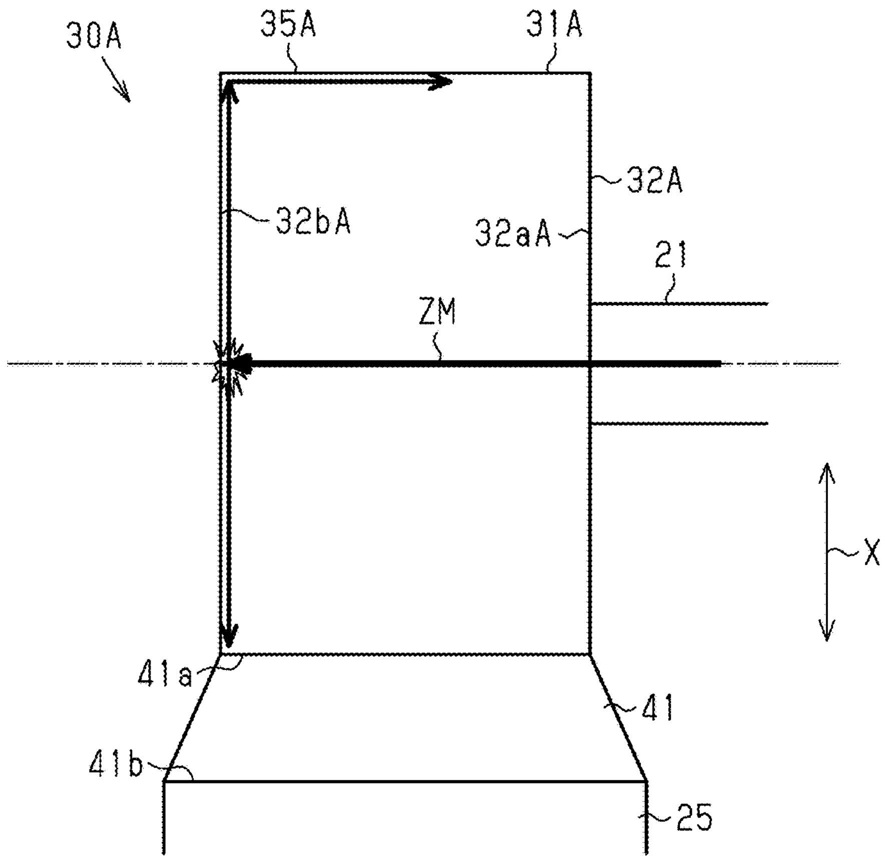
FIG. 4B is a schematic cross-sectional view taken along the central axis of the diffusion portion.

FIGS. 4A and 4B illustrate a connection portion 30A of the exhaust purification apparatus 20 in the present embodiment. The connection portion 30A includes a diffusion portion 31A and a coupling portion 41. FIG. 4A schematically illustrates the cross-sectional shapes of the merging portion 22 of the exhaust manifold 21 and the diffusion portion 31A along the imaginary plane PH1, which is orthogonal to the central axis 31*z* of the diffusion portion 31A. FIG. 4B schematically illustrates the cross-sectional shapes of the diffusion portion 31A, the coupling portion 41, and the catalytic converter 25 along the imaginary plane PH2, which is parallel to the central axis 31*z* of the diffusion portion 31A and orthogonal to the imaginary plane PH1.

As shown in FIGS. 4A and 4B, the diffusion portion 31 includes a tubular portion 32A and a bottom wall portion 35A that closes the opening of the tubular portion 32A. The bottom wall portion 35A is located at one of the two ends of the tubular portion 32A that is opposite to the end where the coupling portion 41 is attached.

The tubular portion 32 has a shape as shown in FIG. 4A. The side surface of the tubular portion 32A includes a connection surface 32*a*A, a collision surface 32*b*A, a first coupling surface 32*c*A, and a second coupling surface 32*d*A. The exhaust manifold 21 is connected to the connection surface 32*a*A. The collision surface 32*b*A is arranged such that the central axis 31*z* of the diffusion portion 31A is positioned between the collision surface 32*b* and the connection surface 32*a*. The exhaust gas that has flowed into the diffusion portion 31A from the exhaust manifold 21 collides with the collision surface 32*b*A. The first coupling surface 32*c*A is positioned in the upward direction Y1 relative to the connection surface 32*a*A and the collision surface 32*b*A. The first coupling surface 32*c*A connects the upper end of the connection surface 32*a*A and the upper end of the collision surface 32*b*A. The second coupling surface 32*d*A is positioned in the downward direction Y2 relative to the connection surface 32*a*A and the collision surface 32*b*A. The second coupling surface 32*d*A connects the lower end of the connection surface 32*a*A to the lower end of the collision surface 32*b*A.

The collision surface 32*b*A is flat. Specifically, the collision surface 32*b* is orthogonal to the imaginary plane PH1 and the imaginary plane PH2.

As shown in FIG. 4A, the cross-sectional shape of the diffusion portion 31A when it is cut; namely, the cross-sectional shapes of the first coupling surface 32*c*A and the second coupling surface 32*d*A along the imaginary plane PH1, which is orthogonal to the central axis 31*z* of the diffusion portion 31A, is arcuate.

Operation and Advantages of Present Embodiment

The collision surface 32*b*A of the diffusion portion 31A is flat. Accordingly, as shown by arrows Z31 in FIG. 4A, some of the exhaust gas that has collided with the collision surface 32*b*A flows along the side surface of the diffusion portion 31A toward the first coupling surface 32*c*A and the second coupling surface 32*d*A. The flow direction in which the exhaust gas flows toward the first coupling surface 32*c*A and the second coupling surface 32*d*A along the side surface of the diffusion portion 31A does not include components in the direction opposite to the main flow direction ZM. As a result, compared to the above-described comparative example, the exhaust gas flows more easily along the side surface of the diffusion portion 31A toward the first coupling surface 32*c*A and the second coupling surface 32*d*A.

Consequently, in the exhaust gas that has collided with the collision surface 32*b*A shown in FIG. 4B, the amount of exhaust gas that directly flows toward the catalytic converter 25 along the collision surface 32*b*A is smaller than that in the comparative example. Thus, the exhaust gas is sufficiently diffused in the diffusion portion 31A. This ensures uniform distribution of the amount of exhaust gas inflow to the front surface of the catalytic converter 25.

Additionally, the coupling portion 41, which is arranged between the diffusion portion 31A and the catalytic converter 25, is configured such that the cross-sectional area of the passage of the coupling portion 41 gradually increases toward the catalytic converter 25. Accordingly, the condensed water generated in the exhaust manifold 21 is less likely to accumulate in the connection portion 30.

Hence, the exhaust purification apparatus 20 achieves both the promotion of the diffusion of exhaust gas flowing into the catalytic converter 25 and the suppression of condensed water.

Modifications

The above-described embodiments may be modified as follows. The above-described embodiments and the following modifications can be combined as long as the combined modifications remain technically consistent with each other.

In the second embodiment, at least one of the first coupling surface 32*c*A and the second coupling surface 32*d*A may be flat.

The phrase “at least one of” as used in this description means “one or more” of a desired choice. as an example, the expression “at least one” as used herein means “only one option” or “both two options” if the number of options is two. as another example, the expression “at least one” used herein means “only one option” or “a combination of any two or more options” if the number of options is three or more.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An exhaust purification apparatus, comprising:
an exhaust manifold;
a cylindrical catalytic converter; and
a connection portion that connects the exhaust manifold to the catalytic converter, wherein
the exhaust purification apparatus is configured such that exhaust gas that has flowed from the exhaust manifold into the connection portion is directed to the catalytic converter,
the connection portion includes:
a tubular diffusion portion to which the exhaust manifold is connected; and
a coupling portion that couples the diffusion portion to the catalytic converter,
the diffusion portion is arranged such that a central axis of the diffusion portion aligns with a central axis of the catalytic converter,
the coupling portion is configured such that a cross-sectional area of a passage of the coupling portion increases from a connection point with the diffusion portion toward a connection point with the catalytic converter,
a side surface of the diffusion portion includes:
a connection surface to which the exhaust manifold is connected;
a collision surface arranged such that a central axis of the diffusion portion is positioned between the collision surface and the connection surface, wherein exhaust gas that has flowed from the exhaust manifold into the diffusion portion collides with the collision surface;
a first coupling surface that couples an upper end of the connection surface to an upper end of the collision surface; and
a second coupling surface that couples a lower end of the connection surface to a lower end of the collision surface, and
cross-sectional shapes of the first coupling surface, the second coupling surface, and the collision surface along a plane orthogonal to the central axis of the diffusion portion are arcuate, wherein a curvature of the cross-sectional shape of the collision surface is smaller than curvatures of the cross-sectional shapes of the first coupling surface and the second coupling surface.

2. An exhaust purification apparatus, comprising:
an exhaust manifold;
a cylindrical catalytic converter; and
a connection portion that connects the exhaust manifold to the catalytic converter, wherein
the exhaust purification apparatus is configured such that exhaust gas that has flowed from the exhaust manifold into the connection portion is directed to the catalytic converter,
the connection portion includes:

a tubular diffusion portion to which the exhaust manifold is connected; and a coupling portion that couples the diffusion portion to the catalytic converter, the diffusion portion is arranged such that a central axis of the diffusion portion aligns with a central axis of the catalytic converter, the coupling portion is configured such that a cross-sectional area of a passage of the coupling portion increases from a connection point with the diffusion portion toward a connection point with the catalytic converter, a side surface of the diffusion portion includes:

a connection surface to which the exhaust manifold is connected;

a collision surface arranged such that a central axis of the diffusion portion is positioned between the collision surface and the connection surface, wherein exhaust gas that has flowed from the exhaust manifold into the diffusion portion collides with the collision surface;

a first coupling surface that couples an upper end of the connection surface to an upper end of the collision surface; and a second coupling surface that couples a lower end of the connection surface to a lower end of the collision surface, and the collision surface is flat.

3. The exhaust purification apparatus according to claim 2, wherein cross-sectional shapes of the first coupling surface and the second coupling surface along a plane orthogonal to the central axis of the diffusion portion are arcuate.

* * * * *